(No Model.)
J. ANDERSON.
APPARATUS FOR BURNING GARBAGE.
No. 355,851. Patented Jan. 11, 1887.
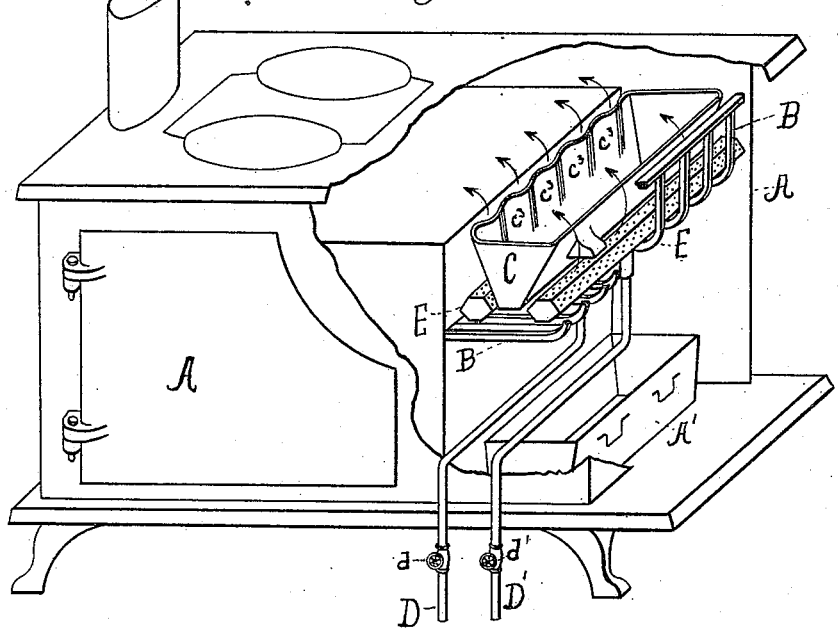
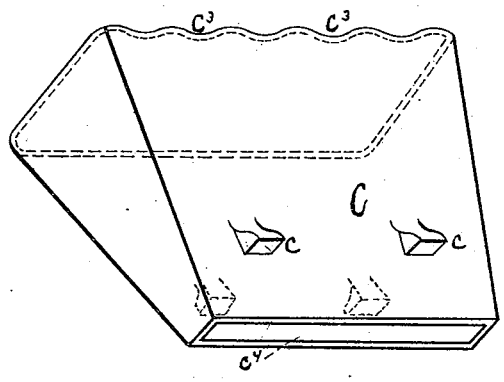
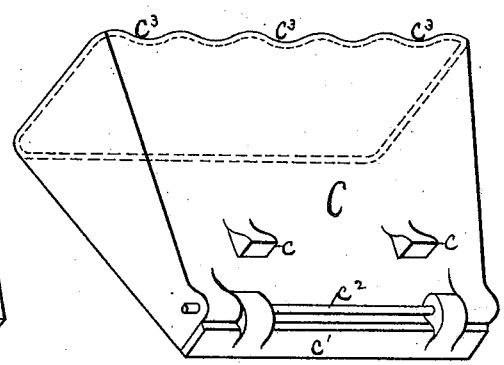

UNITED STATES PATENT OFFICE.

JAMES ANDERSON, OF ALLEGHENY, PENNSYLVANIA.

APPARATUS FOR BURNING GARBAGE.

SPECIFICATION forming part of Letters Patent No. 355,851, dated January 11, 1887.

Application filed August 7, 1886. Serial No. 210,249. (No model.)

*To all whom it may concern:*

Be it known that I, JAMES ANDERSON, of Allegheny, Pennsylvania, have invented a new and useful Improvement in Apparatus for Burning Garbage in Natural-Gas Stoves, which improvement is fully set forth in the following specification, reference being had to the accompanying drawings.

My invention relates to a device for burning garbage in stoves that are heated with natural gas. Since the discovery of this fuel—natural gas—and its application to cook-stoves there has been great inconvenience experienced in burning kitchen garbage, and this difficulty has deterred a great many from using this new fuel. All this difficulty I overcome by my invention, which will be more fully explained hereinafter.

In the accompanying drawings, Figure 1 is a perspective view of a cooking-stove, partly broken away, with my device shown. Fig. 2 is a perspective view of the garbage-pan, showing the bottom of the same, while Fig. 3 is a like view of the same with the bottom closed.

Similar letters of reference indicate corresponding parts.

A represents an ordinary cooking-stove.

B is the fire-grate.

A' is the ash-pan.

C is my garbage-pan, on the back of which are the corrugations $c^3$ $c^3$. These corrugations allow the gas to freely pass up behind the pan C.

$c$ $c$ are rests on the pan C.

$c'$ is a movable bottom for the pan C, and is fastened to the same on the rod $c^2$.

$c^4$ is the opening at the bottom of the pan C, and is in the form of a slot across the entire length of the same. As will be seen by reference to the several figures, this pan C is much wider at the top than at the bottom, an end view being of a V shape.

D and D' are gas-pipes, the former to admit gas to the rear of the pan and the latter to admit gas in front of the same. The gas passes into the metallic burners E E, and out of the same to the combustion-chamber of the stove (or, in other words, to the fire-grate B) through numerous perforations. The quantity of gas thus admitted to the fire-grate is regulated by valves $d$ and $d'$.

The garbage — such as potato and apple peelings, coffee-grounds, corn husks and cobs, besides floor-sweepings, &c.—may be thrown into the pan C, where it is readily consumed by the gas-flame passing over the same and up through the bottom $c^4$, (when left open.) When anything is thrown into the pan C that is likely to at once fall through the bottom $c^4$, then the bottom door or swinging bottom, $c'$, should be closed. Otherwise it may be left open. When a quantity of ashes accumulates in the pan C, they may be raked through to the ash-pan by means of a poker or other suitable means. I put the rests $c$ $c$ on both sides of the pan C. By means of these rests $c$ the pan will be fixed in an upright position with reference to the two burners E, as seen in Fig. 1, where, as will be seen, the burners form a support for the pan by means of the said rests $c$.

Having thus described my invention, what I claim, and desire to secure by Letters Patent, is—

1. The hopper-shaped open-bottom pan herein specified, provided with a corrugated side, substantially as set forth.

2. In a natural-gas stove, the pan C, having the bottom $c^4$, rests $c$, and corrugations $c^3$, substantially as described and shown.

3. The hopper-shaped open-bottom pan provided on its sides with rests or lugs, substantially as specified.

4. The combination, with the longitudinal parallel perforated burners, of the hopper-shaped pan provided with side rests or lugs, substantially as specified.

5. The hopper-shaped open-bottom pan herein specified, said pan being provided with a hinged lid for closing the open bottom thereof, substantially as specified.

6. The combination, with the hopper provided with side lugs, of longitudinal parallel burners and of supply-pipes communicating with said burners, substantially as specified.

In testimony that I claim the foregoing as my invention I hereto set my hand in presence of two witnesses.

JAMES ANDERSON.

Witnesses:
WILLIAM H. STERRITT,
H. STEVENSON.